United States Patent
Duncan

(10) Patent No.: US 10,519,378 B2
(45) Date of Patent: Dec. 31, 2019

(54) RECYCLING AND MATERIAL RECOVERY SYSTEM

(71) Applicant: Tread Heads, LLC, Sandpoint, ID (US)

(72) Inventor: Matthew Louis Duncan, Clarkston, MI (US)

(73) Assignee: Tread Heads, LLC, Sandpoint, ID (US)

( * ) Notice: Subject to any disclaimer, the term of this patent is extended or adjusted under 35 U.S.C. 154(b) by 0 days.

(21) Appl. No.: 16/032,327

(22) Filed: Jul. 11, 2018

(65) Prior Publication Data

US 2018/0320082 A1    Nov. 8, 2018

Related U.S. Application Data

(63) Continuation-in-part of application No. 15/169,995, filed on Jun. 1, 2016, now abandoned.

(51) Int. Cl.
| | |
|---|---|
| C10B 19/00 | (2006.01) |
| C10G 1/10 | (2006.01) |
| C10B 25/16 | (2006.01) |
| C10B 25/06 | (2006.01) |
| C10B 7/06 | (2006.01) |
| C10B 27/06 | (2006.01) |
| C10B 53/07 | (2006.01) |
| B01D 53/04 | (2006.01) |
| C10G 1/02 | (2006.01) |
| C10B 33/02 | (2006.01) |

(52) U.S. Cl.
CPC .............. C10B 19/00 (2013.01); B01D 53/04 (2013.01); C10B 7/06 (2013.01); C10B 25/06 (2013.01); C10B 25/16 (2013.01); C10B 27/06 (2013.01); C10B 33/02 (2013.01); C10B 53/07 (2013.01); C10G 1/02 (2013.01); C10G 1/10 (2013.01); *B01D 2256/24* (2013.01); *C10G 2300/1003* (2013.01)

(58) Field of Classification Search
CPC .... C10G 1/02; C10G 1/10; C10B 7/06; C10B 19/00; C10B 25/16; C10B 33/02; C10B 53/07
See application file for complete search history.

(56) References Cited

U.S. PATENT DOCUMENTS

| | | |
|---|---|---|
| RE24,934 E | 2/1961 | Zollinger |
| 5,330,623 A | 7/1994 | Holland |
| 6,618,957 B2 | 9/2003 | Novak et al. |
| 6,693,265 B1 | 2/2004 | Bell |
| 7,101,464 B1 | 9/2006 | Pringle |
| 7,927,465 B2 | 4/2011 | Novak |
| 8,268,133 B2 | 9/2012 | Novak |
| 8,283,616 B2 | 10/2012 | Novak |
| 8,382,957 B2 | 2/2013 | Farneman et al. |
| 2011/0219679 A1 | 9/2011 | Budarin |
| 2013/0056987 A1 | 3/2013 | Novak |
| 2016/0045841 A1 | 2/2016 | Kaplan et al. |

*Primary Examiner* — Renee Robinson
(74) *Attorney, Agent, or Firm* — James G. Passé; Passé Intellectual Property, LLC

(57) ABSTRACT

The present invention relates to recycling tires and the like utilizing a microwave service controlling the pressure from such a process enables a more even temperature and helps prevent the build-up of explosive gas.

19 Claims, 2 Drawing Sheets

RECYCLING AND MATERIAL RECOVERY SYSTEM

This application is a continuation-in-part of U.S. non-provisional application Ser. No. 15/169,995 filed on Jun. 1, 2016 and is incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to an apparatus, system and method for depropagating polymer based materials. In particular, depropagating polymers, especially those used in vehicle tires.

Description of Related Art

In the field of petrochemicals, the escalating energy costs for oil, natural gas, liquefied petroleum gas, and liquefied natural gas are of increasing concern to those involved in the processing of organic materials, chemicals, and petroleum products. With the inherent aging of the facilities, coupled with the ever-escalating energy and capital equipment costs, refurbishment and replacement costs of these plants become increasingly difficult to justify. Many efforts have been expended in those applications, described in the technical field, to produce directly useable fuels from scrap tires or plastics with substantially improved throughput, increased operating efficiency, reduced energy consumption, or without further treatment, but these efforts have failed due to economic or technical reasons.

Considerable effort and expense has been invested in waste-to-energy and other alternative fuels programs, but have fallen short due to technical issues, limited throughput, expensive after-treatment costs, poor operating efficiency, high energy consumption, or non-commercially viable solutions.

Some effort has gone into these programs, but all suffer from lack of efficiency, problems with explosive gas accumulation, or overheating issues. In particular, U.S. Pat. Nos. 6,618,957, 7,927,465, 8,283,616, and 8,382,957 (all incorporated herein by reference) all attempt to use microwave energy. However, they all have problems including the microwaves quick breaking or melting of windows in the system, microwaves not having acceptable initial targets, excessive release of cooled gasses (thus reducing operation temperature below functional temperatures) and, lastly, excessive pressures on the system as designed results in danger of explosions. Accordingly, the above patented systems are not currently in use. Accordingly, a new system designed to overcome one or more of these design problems is necessary.

BRIEF SUMMARY OF THE INVENTION

This invention addresses the problems of accumulation of waste products, including tires, plastics, roofing shingles, and construction debris, in ever-decreasing space in landfills. In the United States, as of the filing date of this application, only six hazardous disposal landfills remain available for an ever-increasing amount of industrial waste, contaminated soil, and materials removed from locations designated by the EPA as superfund sites. Considering that a new petroleum refinery has not been built in over approximately thirty years, discovery of new major sources of crude oil have been declining over the past decades, and the number of new landfills for waste materials, hazardous and non-hazardous, are not only decreasing, but existing landfills are reaching their capacity, a conversion of waste products into useable by-products is a requisite to overcome these problems. The present invention overcomes the limitations and issues of the previous microwave type devices, as detailed further herein, and represents an improvement in those types of devices.

Accordingly, in one embodiment, there is an improved process for reducing an organic-containing solid material into lower molecular gaseous hydrocarbons, liquid hydrocarbons and solid carbon constituents utilizing a microwave oven system, the improvement comprising:
  a) utilizing a ring vacuum pump to remove gasses from the microwave system;
  b) positioning at least two sources of microwaves in parallel alignment in a ceiling of the system, each source which feeds bifurcated waves into a leaky wave guide diffuser; and
  c) utilizing a replaceable solid medium forced air dry system to remove impurities in the solid material.

In another embodiment, there is an improved microwave oven system for reducing an organic-containing solid material into lower molecular gaseous hydrocarbons, liquid hydrocarbons and solid carbon constituents, the improvement comprising:
  a) a ring vacuum pump to remove gasses from the microwave system;
  b) at least two sources of microwaves positioned in parallel alignment in a ceiling of the oven, each microwave source which feeds bifurcated waves into a leaky wave guide diffuser; and
  c) a replaceable solid medium forced air dry system positioned and designed to remove impurities from the system.

DETAILED DESCRIPTION OF THE INVENTION

Figure 1:
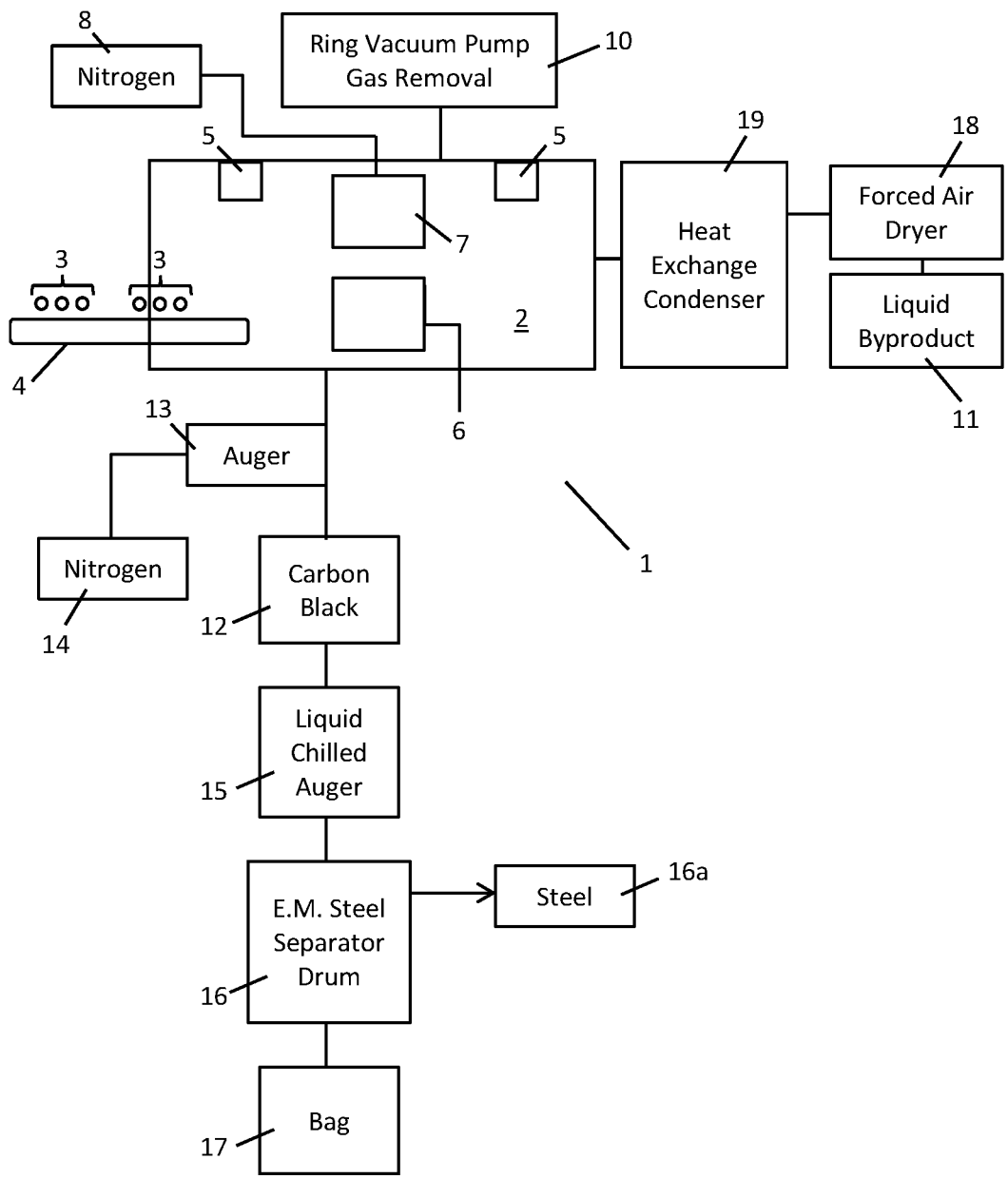
FIG. 1 is a diagram of the present system.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention. The advantages are outlined in the definitions below and include the ability to process both solid and liquid organic material, unlike previous microwave systems which only process from solid starting materials.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein, the term "device or process for reducing an organic-containing solid material into lower molecular gaseous hydrocarbons, liquid hydrocarbons and solid carbon constituents utilizing a microwave oven system" refers to systems as taught in U.S. Pat. Nos. 6,618,957, 7,927,465, 8,283,616, and 8,382,957 (all incorporated herein by reference) which teach the use of microwaves positioned perpendicular to one another and tends to have a high build-up of gasses during processing. The present invention relates to a number of improvements which overall increases the safety and effectiveness of the system, especially when processing tires.

As used herein, the term "ring vacuum pump" refers to the positioning of a ring vacuum pump to remove gasses which build up in the oven of the microwave system. In working with the prior art devices, it was discovered that, when filling an oven, the process of microwaving releases a huge amount of combustible gasses at temperatures far below the operating temperatures (680° F.) taught for such a system. In addition to cooling the system and having produced explosive gasses, the release produces an excessive pressure of 2 to 3 times normal ambient pressure in the oven, resulting in broken wave guide quartz pressure windows and extreme condensation of gasses, making it difficult to remove liquids produced. By engaging a ring vacuum pump to the oven cavity and maintaining a slightly positive pressure on the ovens, removal of accumulated gasses can be accomplished without introducing outside oxygenated air. The present invention aids in startup heating and reduces the dangers associated with high pressure and combustible gasses.

As used herein, the term "two sources of microwaves in parallel alignment, wherein the sources feed bifurcated waves into a leaky wave guide diffuser" refers to placement of the microwave sources. In the prior art, microwave sources were positioned perpendicular to one another, but it has been discovered that by positioning them parallel in the ceiling of the oven, one gets better directed penetration and this eliminates the need for microwave activators, which increase activity within the oven. One other advantage is that, instead of waveguides made of low loss aluminum guides which are expensive and tend to not preserve microwave power, the present invention positioning allows use of regular, otherwise untreated, aluminum for the wave guides.

As used herein, the term "a high heat auger utilizing a gas purging collar" refers to an auger for removal of the carbon black from the system instead of the rotary feed value or drawer/purge system of the prior art. The system of the present invention utilizes a gas purge and, in one embodiment, it is nitrogen gas. This can, in one embodiment, feed to a liquid chilled auger and then an electromagnetic separator drum to remove steel residual pieces before the carbon black is augured to a bagging system for removal. The term "high heat" refers to a temperature between 300 and 500 degrees Celsius.

As used herein, in one embodiment, any doors utilized to seal any produced gasses in the oven are at least ¾ inch thick flat aluminum doors which bolt on an inside of the system and the seams of the doors are sealed by taping with woven fiberglass tape positioned as a gasket for the doors.

As used herein, the system will not use elaborate liquid scrubbers which can utilize thousands of gallons of water per day. The liquid scrubbers have been replaced, in one embodiment, with a solid medium, forced air dry system for removing impurities. Such devices are readily available, such as the Schlumberger® SulfaTreat® adsorbents, however this scrubber has not been utilized for this kind of system before this invention.

In one embodiment, the size of the oven interior is increased to better accommodate the size of the conveyor belt and the accompanying drive system that is utilized in the system. In this embodiment, the interior dimensions of the oven are a multiple of the magnitude of the 915 MHz microwave length with a minimum dimensions in one embodiment of 12 ft. long, 6 ft. wide and 4 ft. tall.

As used herein, the term "belt" refers to the conveyance system for transporting the material into the oven for processing. In the present invention, in one embodiment, efficiencies and cost improvements are achieved by replacing the standard taught belt with a microwave transparent, high heat plastic (e.g. Dupont® VESPEL®) belt. This change causes less microwave reflections within the system during processing and, thus, gives better control of the temperature. In another embodiment, a metal or metal composite belt is contemplated. In another embodiment, the belt is a woven ceramic fiber cloth such as 3M™ Nextel™ fabric AF-62 which is woven from Nextel 312 High Temperature continuous ceramic oxide yarn.

In one embodiment, a blanket of nitrogen is provided on any windows in the oven sufficient to prevent gasses produced in the process from condensing on the windows.

Drawings

Now referring to the drawings, FIG. 1 is a diagram of the improvements of the present invention. In this view, one can see the microwave oven system 1. The system 1 comprises an oven 2 wherein tire particles 3 are introduced through the oven 2 via microwave transparent belt 4. Positioned in oven 2 are parallel microwave emitters with waveguides 5 positioned in the ceiling for even distribution of microwaves. The oven 2 has door 6 and window 7, the window 7 having nitrogen purge 8 for keeping the gasses from condensing on the window. The door, in this embodiment, is ¾ inch thick flat aluminum which is bolted on the inside and sealed at the seams with woven fiberglass tape. A ring vacuum pump 10 removes gasses as they accumulate to lower pressure and to keep the cooler gasses from lowering the temperature in the oven. After passing through the heat exchange condenser 19 and past the forced air dryer/purifier 18, liquids 11 are removed by the previous known methods. Impurities are removed via a replaceable solid medium forced air dry system. Solids such as carbon black 12 are removed via a high heat auger 13 using a nitrogen purge 14. Following that, the carbon black is fed to a chilled auger 15, after which an electromechanical drum separator 16 removes steel pieces 16a from tires, such as are found in steel belted radial tires. Following their removal, carbon black is bagged 17.

Figure 2:
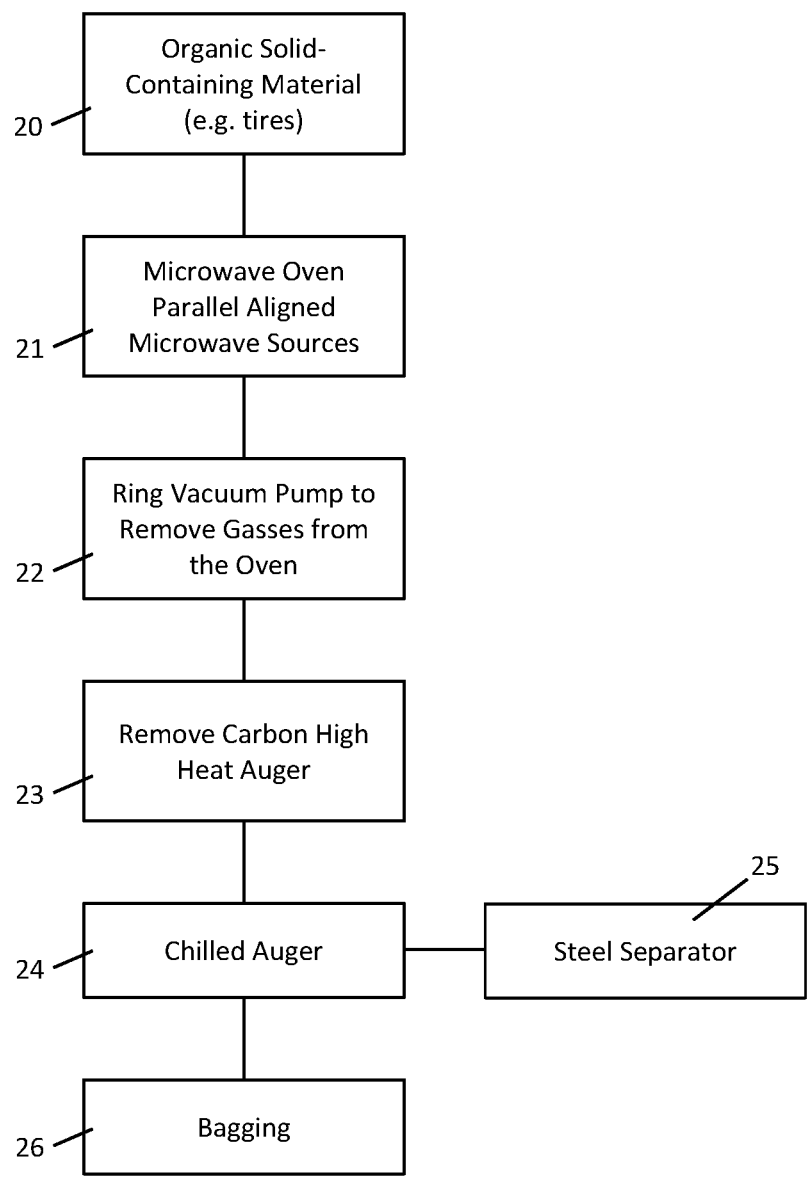
FIG. 2 is a flow diagram of the process of the present invention.

FIG. 2 depicts an embodiment of the process of the present invention. In the process, organic solid containing material, such as tires 20, are processed in a microwave oven system having parallel aligned microwave sources 21, and gasses are removed via a vacuum pump 22. Ring vacuum pump 22 removes the gasses from the oven while a high heat auger removes carbon 23. The carbon is chilled with a chilled auger 24 before steel is being separated 25 and then remaining carbon black bagged 26.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description, or drawings. Consequently, while the present invention has been described with reference to particular embodiments, modifications of structure, sequence, materials and the like apparent to those skilled in the art still fall within the scope of the invention as claimed by the applicant.

What is claimed is:

1. An improved process for reducing an organic-containing solid material into lower molecular gaseous hydrocarbons, liquid hydrocarbons and solid carbon constituents utilizing a microwave oven system, the improvement comprising:
    a) utilizing a ring vacuum pump to remove gasses from the microwave oven system;
    b) positioning at least two sources of microwaves in parallel alignment in a ceiling of the system, each source which feeds bifurcated waves into a leaky wave guide diffuser; and
    c) utilizing a replaceable solid medium forced air dry system to remove impurities in the solid material.

2. The process according to claim 1 wherein the process further comprises a gas purge of the solid carbon constituents utilizing a high heat auger, utilizing a gas purging collar.

3. The process according to claim 2 wherein the purging gas is nitrogen.

4. The process according to claim 2 wherein the high heat auger feeds to a liquid chilled auger.

5. The process according to claim 1 wherein an electromechanical separator drum is used to remove residual steel pieces.

6. The process according to claim 1 wherein any doors utilized to seal any produced gasses are at least ¾ inch thick flat aluminum doors which bolt on an inside of the system and seams of the doors are sealed by taping with woven fiberglass tape positioned as a gasket for the doors.

7. The process according to claim 1 wherein material is conveyed through the microwave oven system utilizing a metal or metal composite belt system.

8. The process according to claim 1 wherein material is conveyed through the microwave oven system utilizing a ceramic fiber cloth.

9. The process according to claim 1 wherein a nitrogen blanket is provided on any windows in the microwave oven system sufficient to prevent gasses produced in the process from condensing on the windows.

10. An improved microwave oven system for reducing an organic-containing solid material into lower molecular gaseous hydrocarbons, liquid hydrocarbons and solid carbon constituents, the improvement comprising:
    a) a ring vacuum pump to remove gasses from the microwave oven system;
    b) at least two sources of microwaves positioned in parallel alignment in a ceiling of the oven, each microwave source which feeds bifurcated waves into a leaky wave guide diffuser; and
    c) a replaceable solid medium forced air dry system positioned and designed to remove impurities from the system.

11. The system according to claim 10 further comprising a high heat auger utilizing a gas purging collar positioned to remove solid carbon constituents.

12. The system according to claim 11 wherein a purging gas is nitrogen.

13. The system according to claim 10 further comprising an electromechanical separator drum positioned to remove residual steel pieces produced in the microwave oven system.

14. The system according to claim 10 further comprising doors utilized to seal any produced gasses, which are at least ¾ inch thick flat aluminum and bolted on an inside of the microwave oven and wherein seams of the doors are sealed by taping with woven fiberglass tape positioned as a gasket for the doors.

15. The system according to claim 10 further comprising at least one window positioned above a cavity of the microwave oven which is provided with a nitrogen blanket sufficient to prevent gasses from condensing on the at least one window.

16. The system according to claim 10 wherein interior dimensions of the microwave oven are a multiple of the magnitude of a 915 mhz microwave length and at least twelve foot long, six foot wide and four feet tall.

17. The system according to claim 10 wherein the waveguides are made of standard aluminum.

18. The system according to claim 10 further comprising a conveyance system comprising a microwave transparent, high heat plastic belt for transporting materials in the system.

19. The system according to claim 10 wherein the organic containing solid material is tires.

* * * * *